Aug. 6, 1968   R. C. BUELER   3,395,944

APPLICATION VALVE

Filed July 8, 1966

INVENTOR
RICHARD C. BUELER
BY
Joseph E. Papin.

United States Patent Office 3,395,944
Patented Aug. 6, 1968

3,395,944
APPLICATION VALVE
Richard C. Bueler, Glendale, Mo., assignor, by mesne assignments, to Wagner Electric Corporation, a corporation of Delaware
Filed July 8, 1966, Ser. No. 563,849
16 Claims. (Cl. 303—52)

ABSTRACT OF THE DISCLOSURE

A control valve including an applied force member for establishing fluid pressure and having opposed differential reaction areas for subjection to the fluid pressure to establish a reaction force opposing the applied force movement of said member, one of said areas being selectively subjected to the atmosphere wherein the other of said areas is responsive to the established fluid pressure to establish another reaction force opposing the applied force movement of said member and being in a predetermined ratio with the first named reaction force.

---

Figure 1:
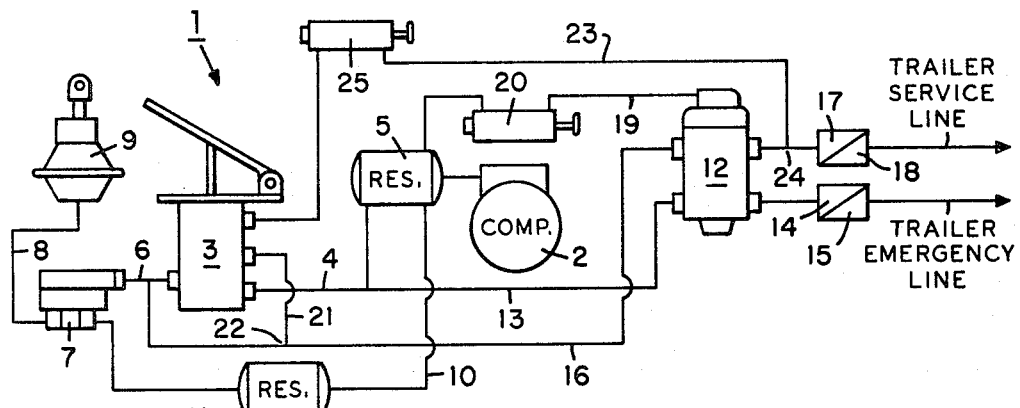

This invention relates to fluid pressure systems and in particular to ratio-changing application valves therefor.

In the past, disadvantageous features effecting undesirable increases in vehicle air brake system sensitivity which, in most instances, deleteriously affected desirable air brake system controllability, i.e., the vehicle operator's ability to control the application valve treadle position and/or treadle force, have been a subject of interest and concern since precise braking controllability is essential to safe vehicle operation, and on larger commercial vehicles, such as tractors and/or trailers for instance, undesirable increases in sensitivity acutely affected braking controllability when such vehicles were operated substantially empty or without load. For example, the foundation brakes for such larger vehicles were necessarily designed to have a braking capacity large enough to adequately meet maximum braking demands or requirements when said vehicle was subjected to maximum loads, and as a resulting disadvantageous feature, said vehicle was greatly overbraked when empty or subjected to minimum loads which served to increase braking sensitivity and decrease braking controllability. Similarly, the suspension systems for such larger vehicles were necessarily designed to provide a satisfactory vehicle ride when subjected to maximum vehicle loads, and as another resulting disadvantageous feature, a rather stiff or sharp vehicle ride was provided in response to minimum vehicle loads which also tended to increase braking sensitivity and decrease braking controllability. In a large measure, the aforementioned disadvantageous feature inherent to brake design and suspension design for larger vehicles were, in combination, responsible for the undesirable variations in braking controllability experienced as vehicle loads decreased or increased.

The past air application valves were generally designed to provide maximum performance for the vehicle operator at maximum vehicle loads which effected both maximum braking sensitivity and maximum braking controllability, and as a resulting disadvantageous feature, the performance of such application valves decreased in response to minimum vehicle loads. In other words, the disadvantageous feature of braking design and suspension design, i.e., overbraking and stiff riding, contributed to braking sensitivity with a resulting decrease in braking controllability in response to minimum vehicle loads or braking loads to amplify or supplement the disadvantageous feature of the application valves, i.e., poorer or decreased performance. Increased braking sensitivity generally served to seriously impair the vehicle operator's ability to exercise the necessary precise control on the application valve and, therefore, decreased braking controllability or erratic vehicle braking resulted. In other words, as the vehicle or braking load decreased, the corresponding braking pressure required to effect proper or desirable vehicle deceleration and/or a complete stop also decreased, and the vehicle operator's ability to immediately adapt or adjust to the reduced application valve treadle reaction force accompanying such reduced braking pressure was generally insufficient to provide continuous and effective braking controllability and to prevent "overshooting" or applying more braking pressure than necessary to effect such desired vehicle deceleration. In this manner, increased braking sensitivity with a corresponding decreased braking controllability effected by the disadvantageous features of brake and suspension designs at minimum vehicle loads amplified or supplemented the disadvantageous feature of reduced application valve performance at minimum vehicle loads to accentuate the vehicle operator's inability to adjust to such conditions whereby any "overshooting" unintentionally effected by the vehicle operator served to immediately lock the vehicle brakes resulting in undesirable vehicle skidding and/or vehicle hopping.

Also in the past, application valves were employed in air brake systems in conjunction with ratio-relay valves, and an operator applied treadle force on said application valve metered fluid pressure from a source thereof to actuate said ratio-relay valve. The ratio-relay valve was responsive to the metered fluid pressure to apply fluid pressure from the aforementioned source or an auxiliary source to actuate a fluid pressure responsive motor for controlling energization of the vehicle brakes. Further, the ratio-relay valve was selectively operable to apply fluid pressure to the motor in a direct proportion or a ratio proportional to that metered thereto from the application valve. Another disadvantageous feature was that the operator was afforded a direct "feel" through the application valve only of the fluid pressure metered to the ratio-relay valve and was not necessarily afforded a direct "feel" as to the extent of the actual braking application. For instance, if the ratio-relay valve was selectively positioned to effect a ratio-braking application, the operator could only feel the metered fluid pressure through the application valve while the fluid pressure actually applied by the ratio-relay valve to effect the braking application was less than the magnitude of the metered fluid pressure. Still another disadvantageous feature was that the applied fluid pressure from the ratio-relay valve could never attain the maximum value of the source connected therewith even though the operator metered full reservoir or source fluid pressure through the application valve to said ratio-relay valve when said ratio-relay valve was selectively positioned for a ratio-braking application. For instance, under emergency conditions it was instinctive for the operator to meter or dump full source fluid pressure to the ratio-relay valve, and if the operator had forgotten that the ratio-relay valve was selectively positioned for a ratio braking application, then the actual applied fluid pressure from said ratio-relay valve could never attain the magnitude of the fluid pressure metered to said ratio-relay valve from said application valve.

Also in the past, fluid pressure systems for tractor-trailer combinations were provided with ratio type application or control valves which were operable in one ratio when such tractor-trailer combinations were subjected to rather heavy load conditions and in another ratio when such tractor-trailer combinations were subjected to relatively light or unloaded load conditions. A disadvantageous feature of such past fluid pressure systems and ratio application valves was that when the trailer was disconnected from the tractor so that the tractor was running "bob-tail," it was necessary for the operator to actuate an auxiliary control valve to revert from the one ratio position thereof for heavy load conditions to the other ratio position thereof for light load conditions in the event that the ratio application valve was in the one ratio position for heavy load conditions when the trailer was disconnected.

An object of the present invention is to provide an application valve which overcomes the aforementioned disadvantageous features.

Another object of the present invention is to provide an application valve in which the performance thereof is adjustable to minimize increased braking sensitivity and decreased braking controllability effected by the undersirable features of vehicle brake and suspension design.

Another object of the present invention is to provide an application valve having satisfactory operating characteristics to provide good braking sensitivity and controllability under both loaded and unloaded vehicle conditions.

Another object of the present invention is to provide an application valve in a vehicle fluid pressure system which is at all times operable to effect maximum energization of the vehicle brakes in accordance with the available maximum fluid pressure of said system.

Another object of the present invention is to provide a unitary application valve of compact and simplified construction which compatibly combines the application and ratio-changing features or characteristics of separate application and ratio-changing valves.

Another object of the present invention is to provide an application valve for a fluid pressure system which compatibly combines the application and ratio-changing features or characteristics of separate application and ratio-changing valves without appreciably increasing the inherent time lag of said system.

Still another object of the present invention is to provide a ratio-changing application valve for a vehicle fluid pressure system which is responsive to selectively operable means to provide both a full or non-ratio braking effect and a reduced or ratio-braking effect.

And still another object of the present invention is to provide a ratio-changing application valve in which a direct "feel" or appraisal as to the extent of the braking application is afforded the operator during a full or non-ratio braking application and also during a reduced or ratio-braking application.

And still another object of the present invention is to provide a fluid pressure system for a tractor-trailer combination having a ratio application valve therein which automatically is conditioned for relatively light load conditions when the tractor is disconnected from the trailer.

These and other objects, features and advantages of the present invention will become apparent hereinafter.

Briefly, the present invention comprises a control valve having application means movable in response to an applied force for controlling the application of fluid pressure therethrough including one area responsive to the applied fluid pressure to oppose the applied force movement of said application means and an opposed area for selective subjection to the applied fluid pressure and the atmosphere, the applied fluid pressure acting on said opposed area upon subjection thereto to establish a ratio force in opposition to the force of the applied fluid pressure acting on said one area and additive to the applied force. The present invention also includes a fluid pressure system for a tractor-trailer combination including means for automatically venting the applied fluid pressure acting on the opposed area of the application means of the control valve to the atmosphere in response to a pre-selected fluid pressure condition in said system.

Figure 2:
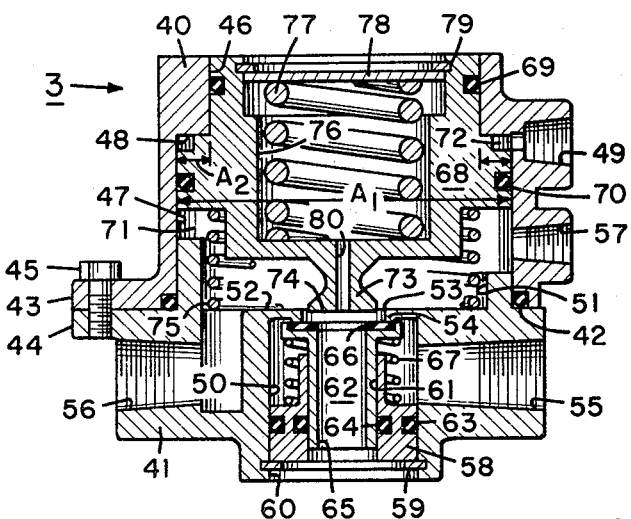
Figure 3:
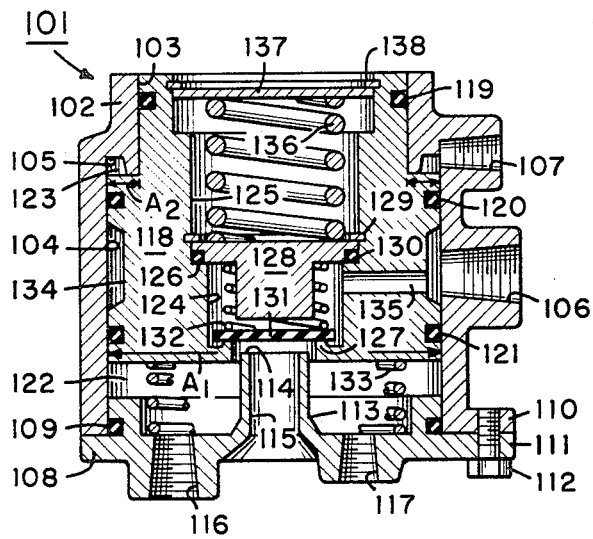

The invention also consists in the parts and arrangement and combination of parts hereinafter described and claimed in the following specification, reference being had to the accompanying drawings which form a part of said specification wherein like numerals refer to like parts wherever they occur, as follows:

FIG. 1 is a diagrammatic view of a fluid pressure system embodying the present invention, FIG. 2 is a sectional view illustrating a control valve for use in the fluid pressure system of FIG. 1 in cross-section and also embodying the present invention, and FIG. 3 is another sectional view illustrating another control valve for use in the fluid pressure system of FIG. 1 in cross-section and also embodying the present invention.

Referring now to the drawings and to FIG. 1 in particular, a fluid pressure system 1 for a tractor-trailer combination is shown having a compressor 2 connected with the inlet side or port of a ratio control or application valve 3 by a conduit or emergency line 4 with a reservoir 5 interposed therein, said compressor and reservoir defining, in combination, a fluid pressure source. Another conduit or service line 6 is interposed between the outlet side or port of the application valve 3 and the control portion of a relay valve 7 of the usual self-lapping type well known to the art and effective to apply fluid pressure in a direct proportion, i.e., 1:1, to that metered thereto, and another conduit 8 is connected between the outlet or delivery portion of said relay valve and a fluid pressure responsive motor or brake chamber 9 for controlling energization of a friction device or wheel brake assembly (not shown). The inlet portion of the relay valve 7 is connected with the reservoir 5 by a conduit 10 having another reservoir, such as auxiliary reservoir 11, interposed therein. A tractor protector valve 12 of a type well known to the art, such as that disclosed in the Cyril B. Fites United States Patent No. 2,859,763 issued Nov. 11, 1958, is operable between a "cocked" or open position and an "uncocked" or closed position for controlling pressure fluid communication through the respective service and emergency lines thereof between the tractor and trailer, and the tractor emergency line 4 is provided with a branch 13 which is connected through the emergency portion of said tractor protector valve to a suitable coupler or glad-hand 14 which is, in turn, releasably connected with another mating coupler or glad-hand 15 on the trailer emergency line. The tractor service line 6 is provided with a branch 16 which is connected through the service portion of the tractor protector valve 12 to a suitable coupler or glad-hand 17 which is, in turn, releasably connected with another mating coupler or glad-hand 18 on the trailer service line. A conducit 19 is connected between the reservoir 5 and the control portion of the tractor protector valve 12, and a push-pull or hand control valve 20 of the usual type well known to the art is interposed in said conduit, said push-pull valve being manually operable between its connecting position connecting said tractor protector valve control portion in open pressure fluid communication with said reservoir and its venting position venting said tractor protector valve control portion to the atmosphere. The ratio application valve 3 is also provided with a pair of ratio or connecting ports, and another conduit 21 has one end connected with one of said ratio ports while the other end thereof intersects the service branch conduit 6 at 22 on the inlet or tractor side of the tractor protector valve 12. To complete the description of the system 1, another conduit 23 has one end connected with the other ratio port in the ratio application valve 3 while the other end thereof intersects with the service branch conduit 6 at 24 on the outlet or trailer side of the tractor protector valve 12, and another push-pull or hand controlled two-way valve 25 of the usual type well known to the art is interposed in the conduit 23, said push-pull valve 25 being movable between its connecting position connecting said other ratio port in pressure fluid communication with the service branch conduit at 24 and its venting position venting said other ratio port to the atmosphere.

The ratio application valve 3, FIG. 2, is provided with upper and lower housings 40, 41 having a seal 42 disposed therebetween, and a plurality of connecting flanges 43, 44 are respectively provided on said upper and lower housings being interconnected by suitable means, such as studs 45.

The upper housing 40 is provided with an aligned bore and counterbore 46, 47 therethrough having a radial shoulder 48 at the juncture thereof, and a ratio or connecting port 49 which receives the conduit 23, as previously mentioned, is provided in said upper housing intersecting said counterbore adjacent to said shoulder. The lower housing 41 is provided with a bore 50 which forms an inlet chamber and an axially aligned counterbore 51 having a radially extending wall 52 interposed therebetween, and a connecting passage 53 is provided through said wall between said bore and counterbore. A valve seat 54 is provided on the wall 52 in circumscribing relation with the connecting passage 53, and the lower housing counterbore 51 is substantially coaxial with the upper housing counterbore 47. Inlet and outlet ports 55, 56 which respectively receive conduits 4, 6, as previously mentioned, are provided in the lower housing 41 respectively intersecting the lower housing bore and counterbore 50, 51, and another ratio or connecting port 57 which receives conduit 21, as previously mentioned, is also provided in the upper housing 40 intersecting with the counterbore 47 thereof adjacent to the wall 52.

A valve guide member 58 is positioned in the lower housing bore 50 against displacement by a snap ring and groove assembly 59 provided adjacent to the lower end of said lower housing bore, and the lower end of said lower housing bore defines an exhaust port 60. The valve guide member 58 is provided with a bore 61 in which a valve element 62 is slidable, and seals 63, 64 are carried by said valve guide member in sealing engagement with the lower housing bore 50 and said valve element, respectively. The valve element 62 is provided with an axial bore or exhaust opening 65 therethrough and has an annular resilient sealing member or disc 66 on the upper end thereof in circumscribing relation with said exhaust opening. A valve spring 67 is biased between the valve element 62 and the valve guide member 58 normally urging the sealing disc 66 into engagement with the valve seat 54 on the lower housing wall 52.

A stepped application member or control piston 68 is slidably received in the upper housing bore and counterbore 46, 47, and peripheral seals 69, 70 are carried in said control piston in sealing engagement with said upper housing bore and counterbore. An outlet or reaction chamber 71 is defined in the housing counterbores 47, 51 between the housing wall 52 and the control piston 68 in open pressure fluid communication with the outlet port 56 and the ratio port 57, and an annular ratio chamber 72 is defined between said control piston and said upper housing counterbore 47 and between the piston seal 70 and the housing shoulder 48, said ratio chamber being in open pressure fluid communication with the ratio port 49. An axial extension 73 is provided on the lower end of the control piston 68 for movement through the connecting passage 53 in the housing wall 52, and a valve seat 74 is provided on the lower or free end of said extension for sealing engagement with the sealing disc 66 of the valve element 62. A return spring 75 is biased between the control piston 68 and the housing wall 52 normally maintaining the valve seat 74 in predetermined spaced relation from the valve element 62. The control piston 68 is provided with an effective cross-sectional reaction area $A_1$ in the outlet chamber 71, and an effective annular cross-sectional ratio area $A_2$ is provided on said control piston in the ratio chamber 72, said ratio area $A_2$ being in opposed relation to and less than the reaction area $A_1$.

A stepped metering spring bore 76 is provided in the upper end of the control piston 68, and a pre-compressed metering spring 77 is biased between the lower end wall of said metering spring bore and a retainer or treadle force receiving plate 78 slidable in said metering spring bore adjacent to the upper end thereof, said plate being retained against displacement by a snap ring and groove assembly 79 provided in the upper end of said metering spring bore. To complete the description of the application valve 3, an auxiliary exhaust passage 80 is provided in the control piston extension 73 connecting with the metering spring bore 76 and extending through the valve seat 74 on the free end of said control piston extension.

In the operation assume that the component parts of the application valve 3 are positioned as above described and that the push-all valves 20, 25 are in their connecting positions to provide pressure fluid communication between the reservoir 5 and the control portion of the tractor protector valve 12 through the conduit 19 and between the ratio port 49 of said application valve and the branch service line 16, respectively. In this manner, when the control portion of the tractor protector valve 12 is subjected to fluid pressure of the reservoir 5, said tractor protector valve is actuated to its "cocked" or open position providing pressure fluid flow therethrough from the tractor branch emergency and service lines 13, 16 to the respective trailer emergency and service lines through the respective couplers 14, 15 and 17, 18. From the foregoing, it should also be noticed that the ratio ports 49, 57 or the outlet and ratio chambers 71, 72 are connected in pressure fluid communication through the conduits 21, 16, the "cocked" tractor protector valve 12, the conduit 23, and the push-pull valve 25 in its connecting position; therefore, with the outlet and ratio chambers 71, 72 connected in pressure fluid communication, the application valve 3 and system 1 are conditioned to effect a full or non-ratio braking application, such as for instance, when the vehicle is carrying a relatively heavy or maximum load. A manually applied treadle force M by the operator on the force receiving plate 78 of the control piston 68 moves said control piston downwardly in the upper housing counterbore 47 against the return spring 75 to sealably engage the extension valve seat 74 with the valve element 62 thereby closing the exhaust openings 65, 80 and isolating the outlet and ratio chambers 71, 72 from the atmosphere. Further downward movement of the control piston 68 disengages the valve element 62 from the valve seat 54 on the housing wall 52 to establish pressure fluid communication between the inlet and outlet ports 55, 56. The established or ouput fluid pressure P flows from the reservoir 5 through the conduit 4, the inlet port 55, the inlet chamber 50, the connecting passage 53, the outlet chamber 71 into the outlet port 56 and therefrom through the service line 6 to controllably actuate relay valve 7. The relay valve 7 is responsive to the fluid pressure P metered thereto by the application valve 3 to effect the application of fluid pressure from the auxiliary reservoir 11 through the conduit 10 to the conduit 8 to actuate the brake chamber 9 which, in turn, energizes the wheel brake assembly associated therewith (not shown). As previously noted, the relay valve 7 is of a type well known to the art wherein the magnitude of the output or applied fluid pressure therefrom is substantially equal to the fluid pressure P controllably metered thereto by the application valve 3. At the same time, the fluid pressure P also flows from the outlet chamber 71 of the control valve 3 through the ratio port 57, the conduit 21 and the service line branch conduit 16, through the "cocked" tractor protector valve 12 and couplers 17, 18 into the trailer service line to actuate the trailer braking system (not shown). The fluid pressure P also flows through the conduit 23 and push-pull valve 25 to the ratio port 49 of the application valve 3 and therefrom into the ratio chamber 72. The fluid pressure P so established in the outlet and ratio chambers 71, 72 acts on the opposed effective areas $A_1$, $A_2$ of the control piston 68 creating differential or opposed forces $F_1 - F_2 = PA_1 - PA_2$, which results in a differential reaction force F substantially equal to and in opposition to the manually applied force M on said control piston, i.e., $M=F=P(A_1-A_2)$. When the differential reaction force F equals the manually applied force M, the control piston 68 is moved upwardly against the metering spring 77 wherein the valve element 62 is positioned in lapped engagement with the housing valve seat 54, and the control piston valve seat 74 is positioned in lapped engagement with said valve element. The reaction force F acting through the metering spring 77 affords the operator a direct and accurate "feel" as to the extent of the braking effort or application. If greater effort is desired, the manually applied force M is increased and the components of the application valve 3 and system 1 function in the same manner as previously described hereinabove to again move the component parts of said control valve to their lapped positions.

When the desired braking effort is attained, the manually applied force M is removed from the control piston 68, and the return spring 75 and the force of the established fluid pressure P acting on the reaction area $A_1$ of said control piston moves said control piston upwardly to its original or inoperative position; therefore, the upward movement of said control piston disengages its seat 74 from the valve element 62 to re-establish communication between the outlet and exhaust ports 56, 60 and exhaust the fluid pressure P from the relay valve 7 through the service line 6, the outlet port and chamber 56, 71, the connecting passage 53, the valve element exhaust opening 65, and said exhaust port to the atmosphere. The relay valve 7 is responsive to such fluid pressure exhaustion to again interrupt pressure fluid communication between the auxiliary reservoir 11 and the brake chamber 9 and vent the fluid pressure from the brake chamber 9 through the conduit 8 to atmosphere thereby de-actuating said brake chamber and effecting de-energization of the wheel brake assembly associated therewith. At the same time, the fluid pressure P is also exhausted from the ratio chamber 72 of the control valve 3 through the ratio port 49, the conduit 23 and push-pull valve 25, the branch service line 16 and tractor protector valve 12, and therefrom through either the conduit 21 and ratio port 57 or the service line 6 and outlet port 56 into the outlet chamber 71 and therefrom to atmosphere, as described. In this manner, exhaustion of the fluid pressure P from the outlet and ratio chambers 71, 72 eliminates the differential reaction force F.

If the operator desires a ratio-braking application, such as for instance, when the vehicle is empty or subjected to minimum load conditions, the operator moves jected to minimum load conditions, the operator moves the push-pull valve 25 to its venting position venting the ratio chamber 72 to the atmosphere through the ratio port 49 the portion of the conduit 23 between said ratio port and said push-pull valve, and the push-pull valve 25 itself. In this manner, the push-pull valve 25 also closes the conduit 23 interrupting pressure fluid communication between the ratio ports 49, 57 of the application valve 3. A manually applied force $Mr$ by the operator on the control piston 68 actuates the valve element 62 to meter an established or output fluid pressure $Pr$ from the application valve 3 to the relay valve 7 which, in turn, applies fluid pressure from the auxiliary reservoir 11 to actuate the brake chamber 9 and from the reservoir 5 to actuate the trailer brake system, as previously described. Since the push-pull valve 25 is in its venting position to vent the ratio chamber 72 of the application valve 3 and the control piston ratio area $A_2$ to atmosphere, while also obviating pressure fluid flow to said ratio chamber from the outlet chamber 71, the fluid pressure $Pr$ established in said outlet chamber acts only on the reaction area $A_1$ of the control piston 68 to create only the force $F_1=PrA_1$, which results in a reaction force $Fr$ substantially equal to and in opposition to the manually applied force $Mr$ on said control piston, i.e., $Mr=Fr=Pr(A_1)$. The reaction force $Fr$ also acts through the metering spring 77 against the manually applied force $Mr$ on the plate 78 to afford the operator a direct and accurate "feel" as to the extent of the non-ratio braking application. It should be noted that the output pressure $Pr$ is less than the output pressure P and in ratio therewith by the proportion of the reaction and ratio areas $$A_1-A_2/A_1$$

When the system 1 is conditioned for a full or non-ratio braking application with the push-pull valve 25 in its connecting position, as described hereinabove, the respective couplers 14, 15 and 17, 18 may be released or separated to disconnect the trailer from the tractor; however, prior to such disconnection of said couplers, the operator will usually move the push-pull valve 20 to its venting position interrupting pressure fluid communication between the reservoir 5 and the control portion of the tractor protector valve 12 and venting the control fluid pressure from the tractor protector valve control portion to the atmosphere. Upon the venting of the control fluid pressure, the tractor protector valve 12 will function reverting to its "uncocked" or closed position to close the tractor service and emergency lines 13, 16 on the inlet side thereof and thereby preserve the fluid pressure integrity of the tractor portion of the system 1. Also, if the operator neglects or forgets to actuate the push-pull valve 20 prior to the disconnection of the couplers 14, 15 and 17, 18, such disconnection will bleed the reservoir 5 down to a predetermined minimum fluid pressure which is supplied to the control portion of the tractor protector valve 12; therefore, the tractor protector valve 12 will automatically function reverting to its "uncocked" or position to preserve the fluid pressure integrity of the tractor portion of the system 1, as described above, in response to the predetermined minimum control fluid pressure supplied to the tractor protector valve control portion. In this manner, the tractor emergency and service lines 13, 16 on the outlet side of the tractor protector valve 12 are vented to atmosphere through their respective tractor couplings 14, 17 which have been disconnected from the trailer couplings 15, 18. Since the conduit 23 is connected with the tractor service line 13 at 24 on the outlet side of the tractor protector valve 12, the ratio chamber 72 of the application valve 3 is automatically vented to atmosphere through the conduit 23 and push-pull valve 25, the portion of the tractor service line 13 on the outlet side of the tractor protector valve 12, and the disconnected coupling 17. Therefore, it is apparent that the system 1 functions to automatically vent the ratio chamber 72 of the application valve 3 upon the disconnection of the trailer from the tractor in order to effect a ratio-braking application when the tractor is running "bobtail," i.e., without the trailer and under minimum load conditions thereby obviating the necessity of the operator remembering to manually actuate the push-pull valve 25 to its venting position to manually effect the ratio-braking application. It is also obvious that the operator may apply full tank pressure to the relay valve 7 even when the system 1 is conditioned for the ratio-braking application merely by increasing the manually applied force such as may occur during emergency or panic actuation of the application valve 3.

Referring now to FIG. 3, a control or application valve 101 is shown therein having substantially the same component parts and functioning in the system 1 in substantially the same manner as the previously described application valve 3 with the following exceptions.

The application valve 101 is provided with an upper housing 102 having an aligned bore and counterbore 103, 104 therethrough, and a radial shoulder 105 is provided on said housing between said bore and counterbore. An inlet port 106 which receives the conduit 4 is provided in the housing 102 intersecting the counterbore 104 adjacent the mid-portion thereof, and a ratio port 107 which receives the conduit 23 is also provided in said housing intersecting with said counterbore adjacent the shoulder 105. A lower housing 108 is provided to close the lower end of the counterbore 104, and a seal 109 is interposed between said lower housing and the upper housing 102, said upper and lower housings being respectively provided with a plurality of connecting flanges 110, 111 interconnected by suitable means, such as studs 112. The lower housing 108 is also provided with an integral extension 113 which protrudes coaxially into the counterbore 104 having a valve seat 114 defined on the free end thereof, and an exhaust port 115 extends coaxially through said extension and valve seat. An outlet port 116 and another ratio port 117, which respectively receive conduits 6, 21, are also provided through the lower housing 108.

A stepped application member or control piston 118 is slidably received in the housing bore and counterbore 103, 104. A peripheral seal 119 is carried in the control piston 118 in sealing engagement with the housing bore 103, and spaced peripheral seals 120, 121 are also carried in said piston in sealing engagement with the housing counterbore 104. An outlet chamber 122 is defined in the housing counterbore 104 between the lower end of the piston 118 and the lower housing 108, said outlet chamber being in pressure fluid communication with the outlet and ratio ports 116, 117, and an annular ratio chamber 123 is defined between said control piston and said upper housing counterbore and between the piston seal 120 and the housing shoulder 105, said ratio chamber being in pressure fluid communication with the ratio port 107. The control piston 118 is provided with an effective cross-sectional reaction area $A_1$ in the outlet chamber 122, and an annular effective cross-sectional ratio area $A_2$ is provided on said piston in the ratio chamber 123, said ratio area $A_2$ being in opposed relation to and less than the reaction area $A_1$.

Stepped bores 124 are provided in the control piston 118 in axial alignment with stepped counterbores 125 having a shoulder 126 therebetween, and a valve seat 127 is defined at the juncture of said stepped bores. Closure member 128 is positioned between the piston stepped bores and counterbores 124, 125 by a snap ring and retainer assembly 129 having a peripheral seal 130 urged into engagement with the shoulder 126. A valve element 131 is normally urged into engagement with the valve seat 127 by a valve spring 132 interposed between said valve element and the closure member 128, and a return spring 133 is biased between the lower end of the control piston 118 and the closure member 108 normally urging said control piston toward its inoperative position and maintaining said valve element in predetermined spaced relation with the exhaust valve seat 114. The piston 118 is also provided with a peripheral groove 134 between the seals 120, 121 thereof and in open pressure fluid communication with the inlet port 106 at all times, and a passage 135 is provided in said piston between said peripheral groove and the larger of the stepped bores 124, said peripheral groove, passage and the larger of said stepped bores defining an inlet chamber in said control piston between the outlet and ratio chambers 122, 123. To complete the description of the control valve 101, a pre-compressed metering spring 136 is provided in the stepped counterbores 125 biased between the closure member 128 and a treadle force receiving plate 137 which is slidable in the larger of said stepped counterbores and retained against displacement therefrom by a snap ring and groove assembly 138.

In the operation assume that the component parts of the application valve 101 are positioned as above described and that the push-pull valves 20, 25 are in their connecting positions to provide pressure fluid communication between the reservoir 5 and the control portion of the tractor protector valve 12 through the conduit 19 and to provide pressure fluid communication between the ratio port 107 of said application valve and the branch service line 16, respectively. In this manner, when the control portion of the tractor protector valve 12 is subjected to the fluid pressure of the reservoir 5, said tractor protector valve is actuated to its "cocked" or open position providing pressure fluid flow therethrough from the tractor branch emergency and service lines 13, 16 to the respective trailer emergency and service lines through the respective couplings 14, 15 and 17, 18. From the foregoing, it should be noted that the ratio ports 107, 117 or the outlet and ratio chambers 122, 123 are connected in pressure fluid communication through the conduits 21, 16, the "cocked" tractor protector valve 12, the conduit 23, and the push-pull valve 25 in its connecting position; therefore, with the outlet and ratio chambers 122, 123 connected in pressure fluid communication, application valve 101 and system 1 are conditioned to effect a full or non-ratio braking application, such as for instance, when the vehicle is carrying a relatively heavy or maximum load.

A manually applied treadle force M by the operator on the force receiving plate and metering spring 136, 137 of the control piston 118 moves said control piston downwardly in the housing counterbore 104 against the return spring 133 to sealably engage the valve element 131 with the exhaust valve seat 114 thereby closing the exhaust port 115 and isolating the outlet and ratio chambers 122, 123 from the atmosphere. Further downward movement of the control piston 118 disengages the valve seat 127 thereof from the valve element 131 to establish pressure fluid communication between the inlet and outlet ports 106, 116. The established or output fluid pressure P flows from the reservoir 5 through the conduit 4, the inlet port 106, the peripheral groove 134, the passage 135 and the stepped bores 124 of the control piston 118 into the outlet chamber 122 and therefrom through the outlet port 116 and the service line 6 to controllably actuate the relay valve 7. The relay valve 7 is responsive to the fluid pressure P metered thereto by the control valve 101 to effect the application of fluid pressure from the auxiliary reservoir 11 through the conduit 10 to the conduit 8 to actuate the brake chamber 9 which, in turn, energizes the wheel brake assembly associated therewith (not shown). As previously noted, the relay valve 7 is of a type well known to the art wherein the magnitude of the output or applied fluid pressure therefrom is substantially equal to the fluid pressure P controllably metered thereto by the control valve 101. At the same time, the fluid pressure P also flows from the outlet chamber 122 of the control valve 101 through the ratio port 117, the conduit 21 and the branch service line 16 through the "cocked" tractor protector valve 12 and couplers 17, 18 into the trailer service line to actuate the trailer braking system (not shown). The fluid pressure P also flows through the conduit 23 and push-pull valve 25 to the ratio port 107 of the application valve 101 and therefrom into the ratio chamber 123. The fluid pressure P so established in the outlet and ratio chambers 122, 123 acts on the opposed effective areas $A_1$, $A_2$ of the control piston 118 creating differential or opposed forces $$F_1 - F_2 = PA_1 - PA_2$$

which results in a differential reaction force F substantially equal and in opposition to the manually applied force M on said control piston, i.e., $M = F = P(A_1 - A_2)$. When the differential reaction force F equals the manually applied force M, the control piston 118 is moved upwardly against the metering spring 136 wherein the valve element 131 is positioned in lapped engagement with the closure member valve seat 114 and the control piston valve seat 127. The reaction force F acting through the metering spring 135 against the manually applied force M on the plate 136 affords the operator a direct and accurate "feel" as to the extent of the braking effort or application. If a greater effort is desired, the manually applied force M is increased and the components of the control valve 101 and the system 1 function in the same manner as previously described hereinabove to again move the component parts of said control valve to their lapped positions.

When the desired braking effort is attained, the manually applied force M is removed from the control piston 118, the return spring 133 and the force of the established fluid pressure P acting on the reaction area $A_1$ of said control piston moves said control piston upwardly toward its original or inoperative position; therefore, the upward movement of said control piston disengages the valve element 131 from the exhaust valve seat 114 to exhaust the fluid pressure P from the relay valve 7 through the service line 6, the outlet port and chamber 116, 122 through the exhaust port 115 to the atmosphere. The relay valve 7 is responsive to such fluid pressure exhaustion to again interrupt pressure fluid communication between the auxiliary reservoir 11 and the brake chamber 9 and vent the applied fluid pressure from the brake chamber 9 and conduit 8 to atmosphere thereby de-actuating said brake chamber and effecting de-energization of the wheel brake assembly associated therewith. At the same time, the fluid pressure P is also exhausted from the ratio chamber 123 of the control valve 101 through the ratio port 107, the conduit 23 and push-pull valve 25, the service line 16 and tractor protector valve 12, and therefrom through either the conduit 21 and ratio port 117 or the service line 6 and outlet port 116, into the outlet chamber 122 and therefrom to atmosphere, as described. In this manner, exhaustion of the fluid pressure P from the outlet and ratio chambers 122, 123 eliminates the reaction force F If the operator desires a ratio-braking application, such as for instance, when the vehicle is empty or subjected to minimum load conditions, the operator moves the push-pull valve 25 to its venting position venting the ratio chamber 123 to atmosphere through the ratio port 107, the portion of the conduit 23 between said ratio port and push-pull valve, and the push-pull valve 25 itself. In this manner, the push-pull valve 25 also closes the conduit 23 interrupting pressure fluid communication between the ratio ports 107, 117 of the application valve 101. A manually applied force Mr by the operator on the control piston 118 actuates the valve element 131 to meter an established or output fluid pressure Pr from the control valve 101 to the relay valve 7 which, in turn, applies fluid pressure from the auxiliary reservoir 11 to actuate the brake chamber 9, as previously described. Since the push-pull valve 25 is in its venting position to vent the ratio chamber 123 of the control valve 101 and the control piston ratio area $A_2$ to atmosphere, while also obviating pressure fluid flow to said ratio chamber from the outlet chamber 122, the fluid pressure Pr established in said outlet chamber 122 acts only on the reaction area $A_1$ of the control piston 118 to create only the force $F_1 = PrA_1$, which results in a reaction force Fr substantially equal to and in opposition to the manually applied force Mr on said control piston, i.e., $Mr = Fr = Pr(A_1)$. The reaction force Fr also acts through the metering spring 136 against the manually applied force Mr on the plate 137 to afford the operator a direct and accurate "feel" as to the extent of the non-ratio braking application. It should be noted that the output fluid pressure Pr is less than the output fluid pressure P and in ratio therewith by the proportion of the reaction and ratio areas $$A_1 - A_2 / A_1$$

When the system 1 is conditioned for a full or non-ratio braking application with the push-pull valve 25 in its connecting position, as described above, the respective couplers 14, 15 and 17, 18 may be released or separated to disconnect the trailer from the tractor; however, prior to such disconnection of said couplers, the operator will usually move the push-pull valve 20 to its venting position interrupting pressure fluid communication between the reservoir 5 and the control portion of the tractor protector valve 12 and venting the control fluid pressure from the tractor protector valve control portion to the atmosphere. Upon the venting of the control fluid pressure, the tractor protector valve 12 will function reverting to its "uncocked" or closed position to close the tractor branch emergency and service lines 13, 16 on the inlet side thereof and thereby preserve the fluid pressure integrity of the tractor portion of the system 1. Also, if the operator neglects or forgets to actuate the push-pull valve 20 prior to the disconnection of the couplers 14, 15 and 17, 18, such disconnection will bleed the reservoir 5 down to a predetermined minimum fluid pressure which is supplied to the control portion of the tractor protector valve 12; therefore, the tractor protector valve 12 will automatically function reverting to its "uncocked" or closed position to preserve the fluid pressure integrity of the tractor portion of the system 1, as described above, in response to the predetermined minimum control fluid pressure supplied to the tractor protector valve control portion. In this manner, the tractor emergency and service lines 13, 16 on the outlet side of the tractor protector valve 12 are vented to atmosphere through their respective couplings 14, 17 which have been disconnected from the respective trailer couplings 15, 18. Since the conduit 23 is connected with the tractor service line 13 at 24 on the outlet side of the tractor protector valve 12, the ratio chamber 123 of the application valve 101 is automatically vented to atmosphere through the conduit 23 and push-pull valve 25, the portion of the tractor service line 13 on the outlet side of said tractor protector valve and the disconnected coupling 17. Therefore, it is apparent that the system 1 functions to automatically vent the ratio chamber 123 of the application valve 101 upon the disconnection of the trailer from the tractor in order to effect a ratio-braking application when the tractor is running "bob-tail," i.e., without the trailer and under minimum load conditions, thereby obviating the necessity of the operator remembering to manually actuate the push-pull valve 25 to its venting position to manually effect the ratio-braking application. It is also obvious that the operator may apply full tank or reservoir pressure to the relay valve 7 even when the system 1 is conditioned for a ratio-braking application merely by increasing the manually applied force such as may occur during emergency or panic actuation of the application valve 101.

In addition to the advantageous features of the present invention set forth hereinabove, it is also apparent that the application valves 3, 101 afford the operator a direct and accurate appraisal or "feel" as to the extent of both the ratio and non-ratio braking applications. In other words, the output fluid pressures Pr and P act on the effective areas $A_1$ and $A_1 - A_2$ of the reaction pistons 68, 118 to create the force $F_1$ which is the reaction force Fr in direction opposition to the applied force Mr and to create an opposed force $F_2$ in opposition to the force $F_1$ and additive to the applied force M, respectively, which is, of course, the differential or ratio reaction force F.

It is apparent that the application valves 3, 101 provide the operator with greater treadle stroke, while also providing an increased reaction area to enhance the performance characteristics thereof for controlling lighter output fluid pressures Pr during a ratio-braking application. In other words, the increased performance of the application valves 3, 101 for controlling the relatively small output fluid pressures Pr during a ratio-braking application when the vehicle is empty or subjected to minimum load conditions counteracts the increased sensitivity of the braking system normally effected by overbraking and stiff riding at minimum vehicle loads.

It is now apparent that novel application or control valves 3, 101 meeting the objects set out hereinbefore are provided and that changes and modifications as to the precise configurations, shapes and details set forth in the disclosure by way of illustration may be made by those skilled in the art without departing from the spirit of the invention, as defined by the claims which follow.

What I claim is:

1. A fluid pressure system comprising a fluid pressure source and a fluid pressure responsive motor, application means for effecting the application of fluid pressure from said source to said motor, said application means including ratio-changing means, selectively operable means movable between one position for subjecting said ratio-changing means to the atmosphere and another position for subjecting said ratio-changing means to the applied fluid pressure, the fluid pressure applied to said motor when said selectively operable means is in the one position thereof being in a predetermined ratio with that applied to said motor when said selectively operable means is in the other position thereof, and other means responsive to a control fluid pressure supplied thereto less than a predetermined value for subjecting said ratio-changing means to the atmosphere when said selectively operable means is in the other position thereof.

2. A fluid pressure system comprising a fluid pressure source and a fluid pressure responsive motor, a control valve connected between said source and motor including application means movable in said control valve in response to an applied force to effect the application of fluid pressure from said source to said motor, and a ratio-changing portion on said application means adapted for selective subjection to the applied fluid pressure and the atmosphere, selectively operable means connected between said motor and said control valve for selectively subjecting said ratio-changing portion to the applied fluid pressure and the atmosphere, the fluid pressure applied to said motor when said ratio-changing portion is subjected to atmosphere being in a predetermined ratio with that applied to said motor when said ratio-changing portion is subjected to the applied fluid pressure, and other means connected between said selectively operable means and said motor and responsive to another pre-selected fluid pressure condition in said system to interrupt communication between said motor and selectively operable means and vent the applied fluid pressure from said ratio-changing portion to the atmosphere through said selectively operable means.

3. A fluid pressure system comprising a fluid pressure source and a fluid pressure responsive motor, application means movable in response to an applied force to effect the application of fluid pressure from said source to said motor including a pair of fluid pressure responsive areas, one of said areas being responsive to the applied fluid pressure to oppose the applied force movement of said application means, and the other of said areas being adapted for selective subjection to the applied fluid pressure and the atmosphere, selectively operable means movable between one position for subjecting said other area to the atmosphere and another position for subjecting said other area to the applied fluid pressure, the applied fluid pressure acting on only said one area in opposition to the applied force when said selectively operable means is in the one position thereof being in a predetermined ratio with the applied fluid pressure acting on said one and other areas when said selectively operable means is in the other position thereof, and other means responsive to a control fluid pressure supplied thereto less than a predetermined value for interrupting communication of the applied fluid pressure to said selectively operable means and venting the applied fluid pressure acting on said other area to the atmosphere through said selectively operable means when said selectively operable means is in its other position.

4. A control valve comprising a housing having a pressure fluid flow passage therethrough, unitary application means movable in said housing and controlling said flow passage, metering means contained in said application means, said application means being movable in response to an applied force on said metering means toward a position in said flow passage effecting the application of fluid pressure therethrough, a pair of opposed fluid pressure responsive areas on said application means, one of said areas being responsive to the applied fluid pressure to establish a reaction force for moving said application means against said metering means and the applied force thereon toward another position in said flow passage interrupting the application of fluid pressure therethrough, and the other of said areas being adapted for selective subjection to the applied fluid pressure and the atmosphere, the applied fluid pressure acting only on said one area in opposition to the applied force movement of said application means when said other area is subjected to the atmosphere being in a predetermined ratio with the applied fluid pressure acting on said one and other areas when said other area is subjected to the applied fluid pressure.

5. An application valve comprising a housing having a pressure fluid flow passage therethrough, unitary application means movable in said housing and defining with said housing a pressure fluid flow passage therethrough, metering spring means contained in said application means, said application means being movable in response to an applied force on said metering spring means toward a position in said flow passage effecting the application of fluid pressure therethrough, a reaction area on said application means responsive to the applied fluid pressure in said flow passage to urge said application means against said metering spring means and the applied force thereon toward another position in said flow passage interrupting the application of fluid pressure therethrough, and another area on said application means in opposed relation with said reaction area and adapted for selective subjection to the applied fluid pressure and the atmosphere, the applied fluid pressure acting on said reaction area to establish a reaction force in opposition to the applied force and acting on said other area upon the subjection thereof to the applied fluid pressure to establish another force additive to the applied force for effecting the application of a proportionally increased fluid pressure through said flow passage.

6. A control valve comprising a housing having inlet and outlet ports therein, valve means controlling pressure fluid communication between said inlet and outlet ports, a unitary valve control member movable in said housing for operative engagement with said valve means, metering spring means contained in said valve control member, said valve control member being movable in response to an applied force on said metering spring means to engage and move said valve means toward a position establishing pressure fluid communication between said inlet and outlet ports, a reaction area on said valve control member responsive to the established fluid pressure at said outlet port to urge said valve control member against said metering spring means and the applied force thereon toward another position wherein said valve means interrupts pressure fluid communication between said inlet and outlet ports, and another area on said valve control member in opposed relation to said reaction area and adapted for selective subjection to the established fluid pressure at said outlet port and the atmosphere, said other area being responsive to the established fluid pressure at said outlet port upon subjection thereto to assist the applied force movement of said valve control member.

7. A control valve comprising a housing having inlet and outlet ports therein, a valve seat on said housing between said inlet and outlet ports, valve means normally urged into engagement with said valve seat interrupting pressure fluid communication between said inlet and outlet ports, a unitary valve control member movable in said housing for operative engagement with said valve means, resilient metering means contained in said valve control member, said valve control member being movable in response to an applied force on said resilient metering means to engage and move said valve means toward a position disengaged from said valve seat establishing pressure fluid communication between said inlet and outlet ports, another port in said housing adapted for selective connection in communication with said outlet port and the atmosphere, a pair of opposed areas on said valve control member respectively responsive to fluid pressure at said outlet and other ports, the established fluid pressure at said outlet port acting on one of said opposed areas to establish a reaction force urging said valve control member against said resilient metering means and the applied force thereon toward a lapped position wherein said valve means is biased into lapped engagement with said valve control member and valve seat interrupting pressure fluid communication between said inlet and outlet ports, and the established fluid pressure at said outlet port also acting on the other of said opposed areas when said other port is connected in communication with said outlet port to establish another force on said valve control member additive to the applied force and opposing the reaction force.

8. A control valve comprising a housing having an inlet chamber therein, a unitary valve control member movable in said housing and defining therewith opposed outlet and ratio chambers, said ratio chamber being adapted for selective connection in communication with said outlet chamand the atmosphere, resilient metering means contained in said valve control member, and valve means controlling pressure fluid communication between said inlet and outlet chambers, said valve control member being movable in response to an applied force on said resilient metering means to engage and move said valve means toward a position establishing pressure fluid communication between said inlet and outlet chambers, the established fluid pressure in said outlet chamber acting on said valve control member therein to urge said valve control member against said resilient metering means and the applied force thereon toward another position in lapped engagement with said valve means wherein said valve means interrupts pressure fluid communication between said inlet and outlet chambers, and the established fluid pressure in said ratio chamber when said ratio chamber is connected in communication with said outlet chamber also acting on the valve control member therein to assist the applied force movement of said valve control member.

9. A control valve comprising a housing having inlet and outlet ports therein, a unitary valve control member movable in said housing and defining therewith a pressure fluid flow passage between said inlet and outlet ports, resilient metering means contained in said valve control member, valve means in said valve control member and controlling said flow passage, a valve seat on said housing for engagement with said valve means, said valve control member being initially movable in response to an applied force on said resilient metering means to engage said valve means with said valve seat and being thereafter further movable relative to said valve means toward a position establishing pressure fluid communication between said inlet and outlet ports through said flow passage, a reaction area on said valve control member responsive to the established fluid pressure at said outlet port to urge said valve control member against said resilient metering means and the applied force thereon toward another position in lapped engagement with said valve means and interrupting pressure fluid communication between said inlet and outlet ports through said flow passage, and another area on said valve control member in opposed relation to said reaction area for selective subjection to the established fluid pressure at said outlet port and the atmospere, said other area being responsive to the established fluid pressure at said outlet port when subjected thereto to assist the applied force movement of said valve control member.

10. A control valve comprising a housing having inlet and outlet ports therein, a unitary valve control member movable in said housing between said ports and defining with said housing a pressure fluid flow passage connected between said ports, resilient metering means contained in said valve control member, valve means in said valve control member and normally urged toward a position closing said flow passage, a valve seat in said housing for engagement with said valve means, said valve control member being initially movable in response to an applied force on said resilient metering means to engage said valve means with said valve seat and being thereafter further movable relative to said valve means toward a position opening said flow passage and establishing pressure fluid communication between said inlet and outlet ports, another port in said housing for selective connection in communication with said outlet port and with the atmosphere, a pair of opposed areas on said valve control member respectively responsive to fluid pressure at said outlet and other ports, the established fluid pressure at said outlet port acting on one of said opposed areas to establish a reaction force urging said valve control member against said resilient metering means and the applied force thereon toward another position in lapped engagement with said valve means closing said flow passage and interrupting pressure fluid communication between said inlet and outlet ports, and the established fluid pressure at said outlet port acting on only said one opposed area in opposition to the applied force movement of said valve control member when the other of said opposed areas is selectively connected with the atmosphere being in a predetermined ratio with the established fluid pressure at said outlet port acting on said one and other opposed areas when said other port is selectively connected in communication with said outlet port.

11. A control valve comprising a housing, a unitary valve control member movable in said housing and defining therewith opposed outlet and ratio chambers and an inlet chamber between said outlet and ratio chambers, said ratio chamber being adapted for selective connection in communication with said outlet chamber and the atmosphere, resilient metering means contained in said valve control member, valve means in said valve control member controlling pressure fluid communication between said inlet and outlet chambers, a valve seat in said outlet chamber, said valve control member being initially movable in response to an applied force on said resilient metering means to engage said valve means with said valve seat and being thereafter further movable relative to said valve means toward a position establishing pressure fluid communication between said inlet and outlet chambers, the established fluid pressure in said outlet chamber acting on the valve control member therein to urge said valve control member against said resilient metering means and the applied force thereon toward another position re-engaged with said valve means and interrupting pressure fluid communication between said inlet and outlet chambers, and the established fluid pressure in said outlet chamber acting only on the valve control member therein in opposition to the applied force movement of said valve control member when said ratio chamber is selectively connected with the atmosphere being in a predetermined ratio with the established fluid pressure in said outlet and ratio chambers acting on said valve control member therein when said ratio chamber is selectively connected in communication with said outlet chamber.

12. A control valve comprising a housing, a counterbore in said housing interposed between a bore and a pair of stepped bores, a valve seat in said housing adjacent to the juncture of said pair of stepped bores, inlet and outlet ports in said housing respectively connected with the larger of said stepped bores and said counterbore, valve means normally urged into engagement with said valve seat to interrupt pressure fluid communication between said inlet and outlet ports, a stepped piston slidable in said bore and counterbore, a valve operating member on said stepped piston and movable through the smaller of said stepped bores for engagement with said valve means, said stepped piston being movable in response to an applied force to move said valve operating member through said smaller stepped bore into engagement with said valve means and thereafter displace said valve means from said valve seat to establish pressure fluid communication between said inlet and outlet ports, a reaction area on said stepped piston responsive to the established fluid pressure at said outlet port to establish a reaction force acting on said stepped piston in opposition to the applied force, and a ratio area on said stepped piston predeterminately less than and opposed to said reaction area for selective subjection to the established fluid pressure at said outlet port and the atmosphere, said ratio area being responsive to the fluid pressure at said outlet port upon subjection thereto to establish a ratio force additive to said applied force and opposed to said reaction force wherein the established fluid pressure at said outlet port when said ratio area is subjected to the fluid pressure at said outlet port exceeds that at said outlet port when said ratio area is subjected to atmosphere by a ratio substantially equal to the ratio between said reaction and ratio areas.

13. The control valve according to claim 12, comprising a ratio port in said housing connecting with said counterbore for selective subjection to the atmosphere and to the established fluid pressure at said outlet port, said stepped piston including a portion slidable in said bore and an enlarged portion slidable in said counterbore between said ratio and outlet ports, said reaction area being disposed on said enlarged portion in said counterbore in pressure fluid communication with said outlet port, and a shoulder between said first named and enlarged portions defining said ratio area and in open pressure fluid communication with said ratio port.

14. A control valve comprising a housing having a bore and counterbore therein, inlet and outlet ports in said housing connected with said counterbore, a stepped piston slidable in said bore and counterbore between said inlet and outlet ports, another bore in said stepped piston substantially coaxial with said housing bore, a force receiving member movable in said other bore, a metering spring in said bore pre-compressed between said member and said stepped piston and normally urging said member into abutting engagement with a portion of said stepped piston, a valve chamber in said stepped piston connected between said inlet and outlet ports, a valve seat on said stepped piston in said valve chamber, valve means in said valve chamber normally urged into engagement with said valve seat interrupting pressure fluid communication between said inlet and outlet ports, another valve seat in said housing extending into said counterbore for engagement with said housing, said stepped piston being initially movable in response to an applied force on said member to engage said valve means with said other valve seat and thereafter movable relative to said valve means to disengage said first narmed valve seat therefrom and establish pressure fluid communication between said inlet and outlet ports, a reaction area on said stepped piston responsive to the established fluid pressure at said outlet port to establish a reaction force urging said stepped piston against said metering spring and member and the applied force thereon toward a position re-engaging said first named valve seat with said valve means and interrupting pressure fluid communication between said inlet and outlet ports, and a ratio area on said stepped piston predeterminately less than and opposed to said reaction area for selective subjection to the established fluid pressure at said outlet port and the atmosphere, said ratio area being responsive to the established fluid pressure at said outlet port upon subjection thereto to establish a ratio force additive to the applied force and opposed to the reaction force wherein the established fluid pressure at said outlet port when said ratio area is subjected thereto is proportionally greater than that at said outlet port when said ratio area is subjected to the atmosphere.

15. The control valve according to claim 14, comprising a ratio port in said housing connecting with said counterbore for selective connection with said outlet port and the atmosphere, said stepped piston including a first portion slidable in said bore, a second portion slidable in said counterbore between said ratio and inlet ports, a third portion slidable in said counterbore between said inlet and outlet ports, peripheral groove means in said stepped piston between said second and third portions in open pressure fluid communication with said inlet port and connected with said valve chamber, said reaction area being defined on said third portion in said counterbore in pressure fluid communication with said outlet port, and a shoulder between said first and second portions defining said ratio area and in open pressure fluid communication with said ratio port.

16. A control valve comprising a housing having a bore and counterbore therein, inlet and outlet ports in said housing connected with said counterbore, a stepped piston slidable in said bore and counterbore between said inlet and outlet ports, a valve chamber in said stepped piston connected between said inlet and outlet ports, a valve seat on said stepped piston in said valve chamber, valve means in said valve chamber normally urged into engagement with said valve seat interrupting pressure fluid communication between said inlet and outlet ports, another valve seat in said housing extending into said counterbore for engagement with said housing, said stepped piston being initially movable in response to an applied force to engage said valve means with said other valve seat and thereafter movable relative to said valve means to disengage said first named valve seat therefrom and establish pressure fluid communication between said inlet and outlet ports, a reaction area on said stepped piston responsive to the established fluid pressure at said outlet port to establish a reaction force in opposition to the applied force, a ratio area on said stepped piston predeterminately less than and opposed to said reaction area for selective subjection to the established fluid pressure at said outlet port and the atmosphere, said ratio area being responsive to the fluid pressure at said outlet port upon subjection thereto to establish a ratio force additive to the applied force and opposed to the reaction force wherein the established fluid pressure at said outlet port when said ratio area is subjected thereto is proportionally greater than that at said outlet port when said ratio area is subjected to the atmosphere in a ratio substantially equal to the ratio between said reaction and ratio areas, a ratio port in said housing connecting with said counterbore for selective connection with said outlet port and the atmosphere, said stepped piston including a first portion slidable in said bore, a second portion slidable in said counterbore between said ratio and inlet ports, a third portion slidable in said counterbore between said inlet and outlet ports, peripheral groove means in said stepped piston between said second and third portions in open pressure fluid communication with said inlet port and connected with said valve chamber, said reaction area being defined on said third portion in said counterbore in pressure fluid communication with said outlet port, and a shoulder between said first and second portions defining said ratio area and in open pressure fluid communication with said ratio port.

References Cited
UNITED STATES PATENTS
3,190,700   6/1965   Fites _____ 303—48

MILTON BUCHLER, *Primary Examiner.*

J. J. McLAUGHLIN, *Assistant Examiner.*